Jan. 15, 1935.  A. R. THOMPSON  1,987,916
FRUIT HANDLING APPARATUS
Filed Oct. 9, 1933

INVENTOR.
Albert R. Thompson.
BY Philip A. Minnis
ATTORNEY

Patented Jan. 15, 1935

1,987,916

UNITED STATES PATENT OFFICE 1,987,916

FRUIT HANDLING APPARATUS

Albert R. Thompson, San Jose, Calif., assignor to Food Machinery Corporation, San Jose, Calif., a corporation of Delaware Application October 9, 1933, Serial No. 692,871

2 Claims. (Cl. 198—45)

This invention relates to improvements in fruit handling apparatus, and has particular reference to the provision of novel means to prevent injury to fruit being conveyed or delivered by mechanical devices.

The subject matter of the invention pertains to certain modifications and improvements in the construction of apparatus such as is used to deliver apples or pears upon a sorting or grading table and which may be particularly applicable for use in connection with the delivery of such fruit from the gradeway of a sizing mechanism to adjacent rotary dispensing bins.

Primarily, the object of the invention is to provide a novel and effective construction whereby fruit may be conveyed and deposited upon a table or into a bin, as the case may be, without bruising or otherwise injuring the fruit. The invention also has for its object to effect the delivery of additional fruit to a partially filled bin in a manner to prevent the stems of incoming pieces of fruit from puncturing the skins of contacted fruit. A still further object is to provide an apparatus with which large quantities of fruit may be carefully and gently handled so as to avoid loss by accidental damage thereto.

An important feature of the present invention resides in the provision of a ramp or apron fixed in conjunction with the delivery point of a fruit conveyer and of sufficient flexibility to form a yieldable runway for fruit from one elevation to a point of delivery at a lower elevation, as from a conveyer to a dispensing bin; the ramp being of sufficient length to provide a cushion between fruit delivered thereover and fruit lying in the bin.

Prior to the use of mechanisms utilizing the present invention delivery ramps have, for the most part, consisted of short, rather stiff aprons over which the fruit quickly rolled to impact with fruit in the bin. This has resulted in damage to a considerable quantity of fruit because of bruises and stem punctures, pears being the greatest offenders in this respect. Pears are naturally thin skinned and their flesh extremely delicate, and the slight impact of one pear upon the stem end of another almost invariably results in stem puncture, and, for the same reasons, extreme care and gentleness in handling is necessary to avoid bruising such fruit. It will be appreciated that the immediate result of either stem punctures or bruises is rapid decay of such fruits, and infected fruits must be immediately discarded to prevent rapid contamination of an entire shipment.

The present invention is characterized in that the delivery ramp, instead of permitting fruit to drop upon or impact the floor of a bin or fruit resting thereon, provides a cushioned runway for the fruit from the point of delivery by a conveyer to a resting place in the bin, the apron or ramp being fashioned to form a protection for fruit lying in the bin against impact by fruit being delivered thereto. A further characteristic of the invention lies in the fact that fruit may be delivered thereby from a higher elevation to a lower by gravity, as distinguished from power driven conveyers in chutes disclosed in the prior art, without violence to the fruit, thus effecting a material saving in both the initial cost of the apparatus and cost of operation. The novel arrangement and combination of parts by means of which these desirable results are obtained can best be described in connection with the accompanying drawing, in which:

Figure 2:
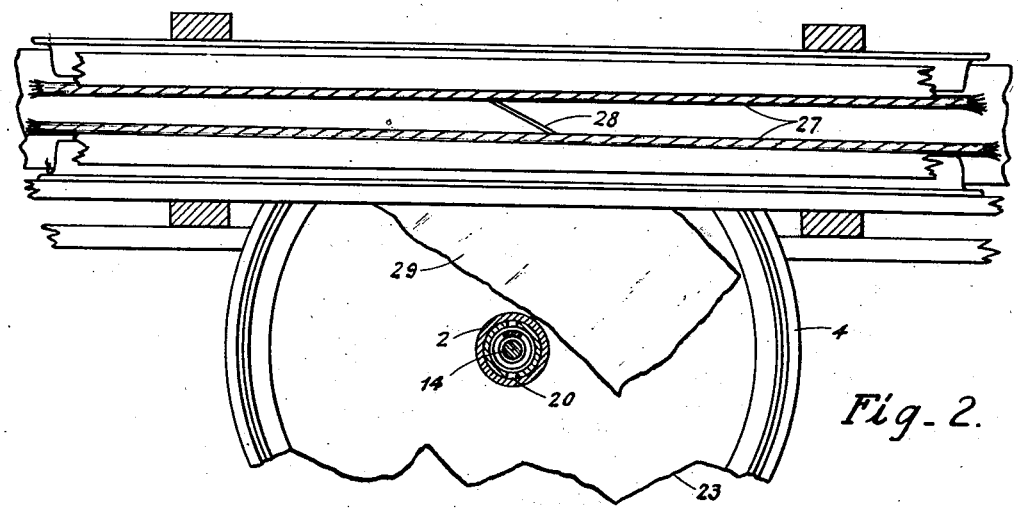
Figure 2 is a plan view of the apparatus, partly in cross section taken along the line 2—2 of Figure 1.
Figure 1:
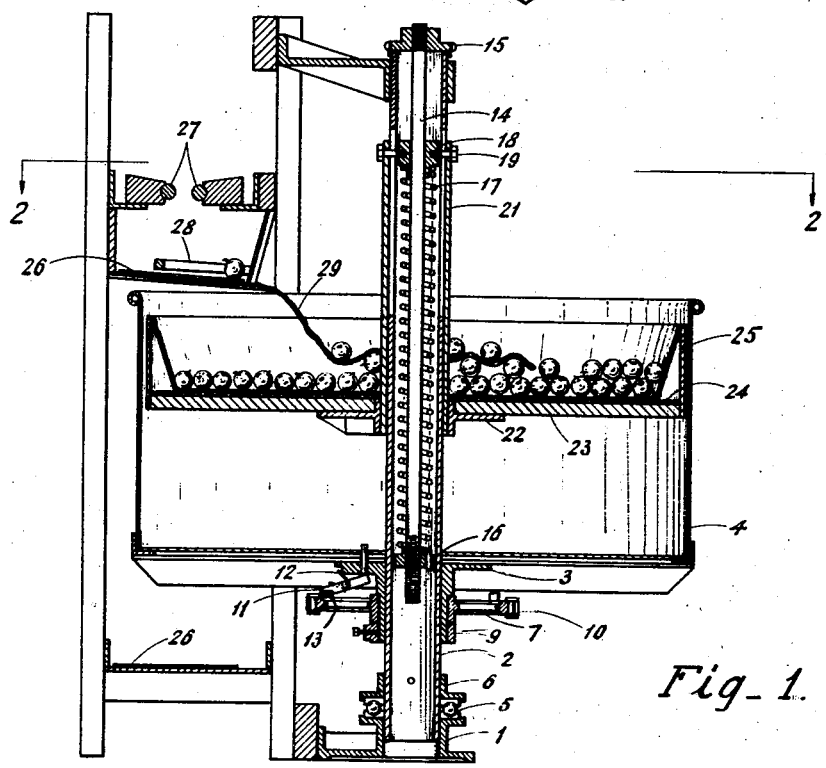
Figure 1 is a vertical cross section of an apparatus embodying my invention, the same being illustrated as associated with a sizing and distributing mechanism.

The drawing illustrates the apparatus embodying the invention as employed in connection with a divergent rope sizing mechanism and complementary delivery belt and an associated rotary dispensing bin. The bin structure comprises a pedestal 1, an upwardly projecting hollow rotatable shaft 2, affixed to which is a flanged seat 3, upon which rests a circular bin 4. Thrust bearings 5 and collar 6 support the shaft 2 upon the pedestal 1.

Means for driving the bin 4 comprises a sprocket 7 loosely journalled on the hub of the seat 3 and held in place by the collar 9. Continuous rotation of the sprocket may be effected from any suitable source of power by the chain 10. Driving connection between the sprocket 7 and the bin 4 is accomplished by means of a pawl 11 pivotally secured to the underside of the seat 3 and normally depressed by a spring 12 so as to engage one of a series of upstanding lugs 13 provided on the upper side of the sprocket 7.

Axially disposed within the shaft 2 is a rod 14 secured to and depending from a cap 15 fitted over the top of the shaft, said rod being threaded at its lower end to carry a stop nut 16. Disposed concentrically about the rod 14 above the stop nut is a helical spring 17 which supports the collar 18. Bolts 19 are threaded into said collar and extend through slots 20 in the shaft 2 to support a sleeve 21, slidably mounted upon the shaft 2 for vertical movement thereover. Mounted upon the lower end of the sleeve 21 is a seat or flange 22 upon which rests a circular tray 23 which forms the bin bottom, which is padded as at 24 to provide a cushion upon which to receive fruit delivered to the bin. The tray is provided with a peripheral wall 25 which, being of less diameter than the bin 4, permits vertical movement of the tray within the bin.

In the construction shown fruit is delivered to the bin by means of an endless conveyer belt 26 which, as illustrated, may be the carrier belt of a fruit sizer, or may be any ordinary conveyer. Fruit is carried along by the divergent ropes 27 until their divergence permits it to be deposited upon the carrier belt 26. The pieces of fruit are carried along by the carrier belt until they strike the diverting strip 28 which shunts them off the belt into the bin over the flexible ramp or apron 29.

The ramp or apron 29 is of sufficient length and flexibility that it lies over a portion of the fruit in the bin, limply undulating with the contour of the fruit as the fruit moves thereunder by the rotation of the bin.

In the operation of the illustrated device pieces of fruit of a uniform size are released by the divergence of the sizing ropes 27 and deposited upon the delivery belt 26 which carries them along until they come in contact with the diverting strip 28, by which they are shunted off the belt and over the ramp 29 into the bin 4. This ramp, instead of being of a short, stiff material off of which the fruit quickly rolls to impact fruit lying in the bin, as in prior constructions, is composed of a pliable material of sufficient length to allow its free end to lie upon and extend a short distance over the top layer of fruit in the bin. In such a construction the ramp yields to the weight of a piece of fruit rolling from the delivery belt into the bin in such manner as to form a travelling valley or pocket for the fruit so as to retard its descent. The piece of fruit is not dropped onto fruit in the bin, therefore, but instead comes to a stop while yet on the delivery ramp, naturally finding a resting place in a valley formed by the contour of the ramp as it lies upon the fruit in the bin, the limpness of the ramp permitting it to sag in the spaces between adjacent pieces of fruit thereunder. Rotation of the bin carries the fruit from under the ramp, the pieces of fruit resting on the ramp being gently deposited upon other fruit in the bin as the ramp is pulled from beneath them. By this construction, bruising of the fruit and injury by stem puncture, so often resulting from the use of mechanical delivery means, is wholly avoided, yet without any loss of efficiency of the apparatus involved, with the result that a greater percentage of choice fruits reach their intended markets in perfect condition.

It will be understood that the sizing mechanism and complementary dispensing bin and their component parts disclosed and described herein are for illustrative purposes only, and that various changes in the arrangement or adaptation of the subject matter of the invention, as well as in its form, proportion or size may be resorted to without departing from the spirit or sacrificing any of the advantages of the inventive concept; and I believe myself entitled to all such modifications as may fall within the scope of the appended claims.

Having now described my invention and in what manner the same may be used, what I claim as new and desire to protect by Letters Patent is:

1. In combination with a rotary fruit dispensing bin, means for delivering fruit thereto including an apron upon which the fruit is received as it is delivered to the bin, said apron being mounted to rest upon and drag over fruit carried therebeneath by the rotating bin, and being sufficiently limp to conform to the contour of fruit therebeneath under the weight of fruit thereupon, whereby movement of the fruit beneath said apron imparts an undulating motion thereto to advance fruit thereover onto the fruit in the bin.

2. In combination with a rotary fruit dispensing bin, means for delivering fruit thereto including an apron upon which the fruit is received as it is delivered to the bin and having a free end arranged to trail over the surfaces of fruit carried therebeneath as the bin rotates, said apron being sufficiently limp to conform to the contour of fruit therebeneath under the weight of fruit deposited thereupon, whereby fruit received by the apron lodges in the depressions caused by sagging of said apron into the spaces between pieces of fruit therebeneath and is caused to advance over the apron by the undulations imparted thereto by the fruit passing thereunder.

ALBERT R. THOMPSON.

DISCLAIMER 1,987,916.—*Albert R. Thompson*, San Jose, Calif. FRUIT HANDLING APPARATUS. Patent dated January 15, 1935. Disclaimer filed July 27, 1936, by the assignee, *Food Machinery Corporation*.

Hereby enters this disclaimer to claims 1 and 2 of said Letters Patent.

[*Official Gazette August 25, 1936.*]